US009621863B2

(12) United States Patent
Mizuno

(10) Patent No.: US 9,621,863 B2
(45) Date of Patent: Apr. 11, 2017

(54) PROJECTOR AND LIGHT EMISSION CONTROL METHOD IN THE PROJECTOR

(71) Applicant: SEIKO EPSON CORPORATION, Tokyo (JP)

(72) Inventor: Kengo Mizuno, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 143 days.

(21) Appl. No.: 13/932,490

(22) Filed: Jul. 1, 2013

(65) Prior Publication Data

US 2014/0022513 A1 Jan. 23, 2014

(30) Foreign Application Priority Data

Jul. 17, 2012 (JP) .................................. 2012-158382

(51) Int. Cl.
*H04N 9/31* (2006.01)
*G03B 21/20* (2006.01)

(52) U.S. Cl.
CPC ......... *H04N 9/3182* (2013.01); *H04N 9/3194* (2013.01); *G03B 21/204* (2013.01)

(58) Field of Classification Search
CPC ...... G03B 21/13; G03B 21/142; G03B 37/04; G03B 21/204; G03B 21/2033; G03B 21/2053; H04N 5/202; H04N 9/69; H04N 9/68; H04N 9/73; H04N 5/7416; H04N 9/3155; H04N 9/3161; H04N 9/3182; H04N 9/3185; H04N 9/3194

(Continued)

(56) References Cited

U.S. PATENT DOCUMENTS 5,428,408 A * 6/1995 Stanton ......................... 348/742
2002/0131022 A1 9/2002 Shibatani et al.
(Continued)

FOREIGN PATENT DOCUMENTS

CN 1619356 A 5/2005
CN 1648765 A 8/2005
(Continued)

OTHER PUBLICATIONS

Dec. 29, 2014 Office Action issued in U.S. Appl. No. 13/922,680.
U.S. Appl. No. 13/922,680 in the name of Mizuno filed Jun. 20, 2013.

*Primary Examiner* — Christina Riddle
*Assistant Examiner* — Christopher Lamb, II
(74) *Attorney, Agent, or Firm* — Oliff PLC

(57) ABSTRACT

A projector including: a projecting unit including a plurality of light sources and a modulating unit configured to modulate lights emitted by the plurality of light sources, the projecting unit projecting modulated light modulated by the modulating unit; an optical system configured to optically change a projection state of the modulated light projected from the projecting unit; an optical-system adjusting unit configured to change a state of the optical system; a storing unit configured to store states of the optical system and adjustment values of light emission amounts of the respective light sources for adjusting white balance of the modulated light in association with each other; and a light-emission-amount adjusting unit configured to adjust the light emission amounts of the respective light sources on the basis of the adjustment values corresponding to the states of the optical system.

15 Claims, 7 Drawing Sheets

(58) Field of Classification Search
USPC .................................. 353/31, 121, 85, 97
See application file for complete search history.

(56) References Cited

U.S. PATENT DOCUMENTS

| | | |
|---|---|---|
| 2005/0073845 A1 | 4/2005 | Matsui |
| 2005/0122481 A1 | 6/2005 | Yamasaki et al. |
| 2005/0169572 A1 | 8/2005 | Itoh |
| 2005/0179871 A1* | 8/2005 | Kobayashi et al. ............ 353/31 |
| 2006/0007409 A1* | 1/2006 | Sato ................................ 353/97 |
| 2006/0170883 A1 | 8/2006 | Matsui |
| 2006/0215130 A1* | 9/2006 | Nakamura et al. ............. 353/97 |
| 2009/0153447 A1 | 6/2009 | Mizusako et al. |
| 2010/0045895 A1 | 2/2010 | Komiya |
| 2011/0043764 A1* | 2/2011 | Narikawa ............ G03B 21/204 353/31 |
| 2011/0228232 A1* | 9/2011 | Sakata .................. G02B 7/008 353/31 |
| 2012/0002173 A1* | 1/2012 | Akiyama ........... G03B 21/2013 353/30 |
| 2012/0008105 A1* | 1/2012 | Katou ................ G03B 21/2033 353/85 |
| 2012/0038892 A1* | 2/2012 | Kurtz ..................... G03B 21/14 353/31 |

FOREIGN PATENT DOCUMENTS

| | | |
|---|---|---|
| JP | 2004-184852 A | 7/2004 |
| JP | A-2006-140839 | 6/2006 |
| JP | 2006-178080 A | 7/2006 |
| JP | 2007-322945 A | 12/2007 |
| JP | 2008-089836 A | 4/2008 |
| JP | 2008-233487 A | 10/2008 |
| JP | 2009-145586 A | 7/2009 |
| JP | 2009-244809 A | 10/2009 |
| JP | 2009-265135 A | 11/2009 |
| JP | A-2010-051068 | 3/2010 |
| JP | 2011-044367 A | 3/2011 |
| JP | 2011-145368 A | 7/2011 |

* cited by examiner

PROJECTOR AND LIGHT EMISSION CONTROL METHOD IN THE PROJECTOR

CROSS-REFERENCE

The entire disclosure of Japanese Patent Application No. 2012-158382 filed on Jul. 17, 2012, which is hereby incorporated by reference in its entirety.

BACKGROUND

1. Technical Field

The present invention relates to a projector that projects an image on a projection surface using a plurality of light sources and a light emission control method in the projector.

2. Related Art

There has been known a projector that modulates light from a light source on the basis of an input image and projects the light on a screen via a projection lens. It is known that, in the projector, white balance changes because of a change in a characteristic of the light source when the light source is replaced or because of a change in a characteristic (illuminance) of the light source over time. Therefore, there has been proposed a projector having a function of adjusting the white balance of an image actually projected on a screen to an appropriate state (see, for example, JP-A-2006-140839).

There has been known a projector including a light source that can adjust luminance through PWM (pulse width modulation) control such as an LED or a laser (see, for example, JP-A-2010-051068).

In a projector including a plurality of light sources, optical outputs of the light sources are not always uniform and paces of aged deterioration of the light sources are not always uniform either. When a state of an optical system changes, white balance sometimes changes because, for example, optical path lengths from the light sources to the focus of a lens are different. In this way, in the projector including the plurality of light sources, white balance changes in a complicated manner. If the white balance of an image projected on a screen is actually measured and adjusted every time the white balance changes, the white balance is frequently adjusted and the adjustment takes time.

SUMMARY

An advantage of some aspects of the invention is to provide a projector and a light emission control method in the projector that can eliminate the problems of the related art and appropriately keep the white balance of light projected by the projector.

An aspect of the invention is directed to a projector including: a projecting unit including a plurality of light sources and a modulating unit configured to modulate lights emitted by the plurality of light sources, the projecting unit projecting modulated light modulated by the modulating unit; an optical system configured to optically change a projection state of the modulated light projected from the projecting unit; an optical-system adjusting unit configured to change a state of the optical system; a storing unit configured to store states of the optical system and adjustment values of light emission amounts of the respective light sources for adjusting the white balance of the modulated light in association with each other; and a light-emission-amount adjusting unit configured to adjust the light emission amounts of the respective light sources on the basis of the adjustment values corresponding to the states of the optical system.

According to the aspect of the invention, even if the white balance changes because of a state change of the optical system, it is possible to appropriately and quickly adjust the white balance of the modulated light by adjusting the light emission amounts of the light sources on the basis of the stored adjustment values.

The projector of the aspect of the invention may be configured such that the storing unit stores a specific state of the optical system and the adjustment values in association with each other, and the projector further includes a control unit configured to adjust, when the optical system is adjusted to the specific state by the optical-system adjusting unit, the light emission amounts of the light sources using the light-emission-amount adjusting unit on the basis of the adjustment values stored in the storing unit and adjust, when the optical system is adjusted to a state other than the specific state by the optical-system adjusting unit, the light emission amounts of the light sources using the light-emission-amount adjusting unit on the basis of an estimated value calculated from the adjustment values stored in the storing unit.

According to this configuration, it is possible to quickly adjust the white balance even if the white balance changes according to a state change of the optical system. Further, even if adjustment values of the white balance are few, the white balance can be adjusted in various states and a large number of adjustment values are unnecessary. Therefore, it is possible to reduce time required for acquisition of the adjustment values.

The projector of the aspect of the invention may be configured to further include an adjustment-value acquiring unit configured to acquire adjustment values for adjusting the white balance of the modulated light modulated when the optical system is in the specific state and store a state of the optical system and the adjustment values in the storing unit in association with each other.

According to this configuration, since the state of the optical system and the adjustment values of the white balance in the state are stored in association with each other, it is possible to reduce the number of times the adjustment values are actually detected.

The projector of the aspect of the invention may be configured to such that the projector further includes: a color-light converting unit configured to generate a plurality of color lights from light of any one of the light sources through color conversion and/or light splitting; and a modulating unit configured to modulate the plurality of color lights generated by the color-light converting unit, and the control unit calculates, on the basis of the state of the optical system, adjustment amounts of light amounts of the respective color lights from the adjustment values stored in the storing unit or an estimated value calculated from the adjustment values stored in the storing unit and further calculates adjustment amounts of the respective light sources to adjust light emission amounts of the light sources using the light-emission-amount adjusting unit.

According to this configuration, in a configuration in which a plurality of color lights are generated from one light source through color conversion and/or light splitting, even if the white balance changes according to a change in the state of the optical system, it is possible to appropriately and quickly adjust the white balance.

The projector of the aspect of the invention may be configured such that the optical system includes a mechanism configured to move an optical component, the optical-system adjusting unit changes the position of the optical component using the mechanism, and the adjustment-value acquiring unit acquires adjustment values for adjusting, when the position of the optical component of the optical system is a specific position, the white balance of combined light obtained by combining lights emitted by the plurality of light sources.

According to this configuration, since the position of the optical component is changed, for example, even if the white balance changes because of differences among optical path lengths from the respective light sources, it is possible to appropriately and quickly adjust the white balance.

The projector of the aspect of the invention may be configured such that the projector further includes: a detecting unit configured to detect the white balance of the modulated light; and a detected-value retaining unit configured to detect, using the detecting unit, the white balance of the modulated light modulated when the optical system is in the specific state and retain a detected value of the white balance, and the adjustment-value acquiring unit acquires the adjustment values from the detected value retained by the detected-value retaining unit.

According to this configuration, it is possible to appropriately adjust the white balance on the basis of an actual detected value. Further, it is possible to calculate an adjustment value obtained from a representative detected value and acquire another adjustment value. Therefore, it is possible to reduce the number of times the white balance is actually detected.

The projector of the aspect of the invention may be configured such that the adjustment-value acquiring unit acquires the adjustment values on the basis of a measured value obtained by measuring the modulated light on the outside of the projector and the detected value detected by the detecting unit.

According to this configuration, it is possible to more accurately adjust the white balance by using the measured value measured on the outside of the projector. It is possible to adjust the white balance without performing a large number of times of detection according to a state change of the optical system. Therefore, it is possible to prevent an increase in labor and time required for the adjustment.

Another aspect of the invention is directed to a light emission control method in a projector including a plurality of light sources, a projecting unit configured to modulate lights emitted by the plurality of light sources and project modulated light, and an optical system configured to optically change a projection state of the modulated light projected from the projecting unit, the light emission control method including: changing a state of the optical system, storing states of the optical system and adjustment values of light emission amounts of the respective light sources for adjusting the white balance of the modulated light in association with each other, and adjusting the light emission amounts of the respective light sources on the basis of the adjustment values corresponding to the states of the optical system.

According to this aspect of the invention, even if the white balance changes because of a state change of the optical system, it is possible to appropriately and quickly adjust the white balance of the modulated light by adjusting the light emission amounts of the light sources on the basis of the stored adjustment values.

According to the aspects of the invention, in the projector including the plurality of light sources, even if the white balance changes because of a state change of the optical system, it is possible to appropriately and quickly adjust the white balance.

BRIEF DESCRIPTION OF THE DRAWINGS

The invention will be described with reference to the accompanying drawings, wherein like numbers reference like elements.

FIGS. 6A and 6B are diagrams illustrating a specific state of the projection lens stored in the storing unit, wherein FIG. 6A is a diagram showing a configuration in which adjustment values are stored in association with a plurality of positions of the projection lens and FIG. 6B is a diagram showing a configuration in which an adjustment value of the specific position of the projection lens and a change amount from the adjustment value are stored.

FIGS. 7A and 7B are diagrams illustrating a specific state of the projection lens stored in the storing unit, wherein FIG. 7A is a diagram showing a configuration in which adjustment values are stored in association with a plurality of states of the zooming of the projection lens and FIG. 6B is a diagram showing a configuration in which an adjustment value in a specific state of the zooming and a change amount from the adjustment value are stored.

FIGS. 8A and 8B are diagrams illustrating a specific state of the projection lens stored in the storing unit, wherein FIG. 8A is a diagram showing a configuration in which adjustment values are stored in association with a plurality of states of the lens diaphragm of the projection lens and FIG. 8B is a diagram showing a configuration in which an adjustment value in a specific state of the lens diaphragm and a change amount from the adjustment value are stored.

DESCRIPTION OF EXEMPLARY EMBODIMENTS

An embodiment to which the invention is applied is explained below with reference to the drawings.

Figure 1:
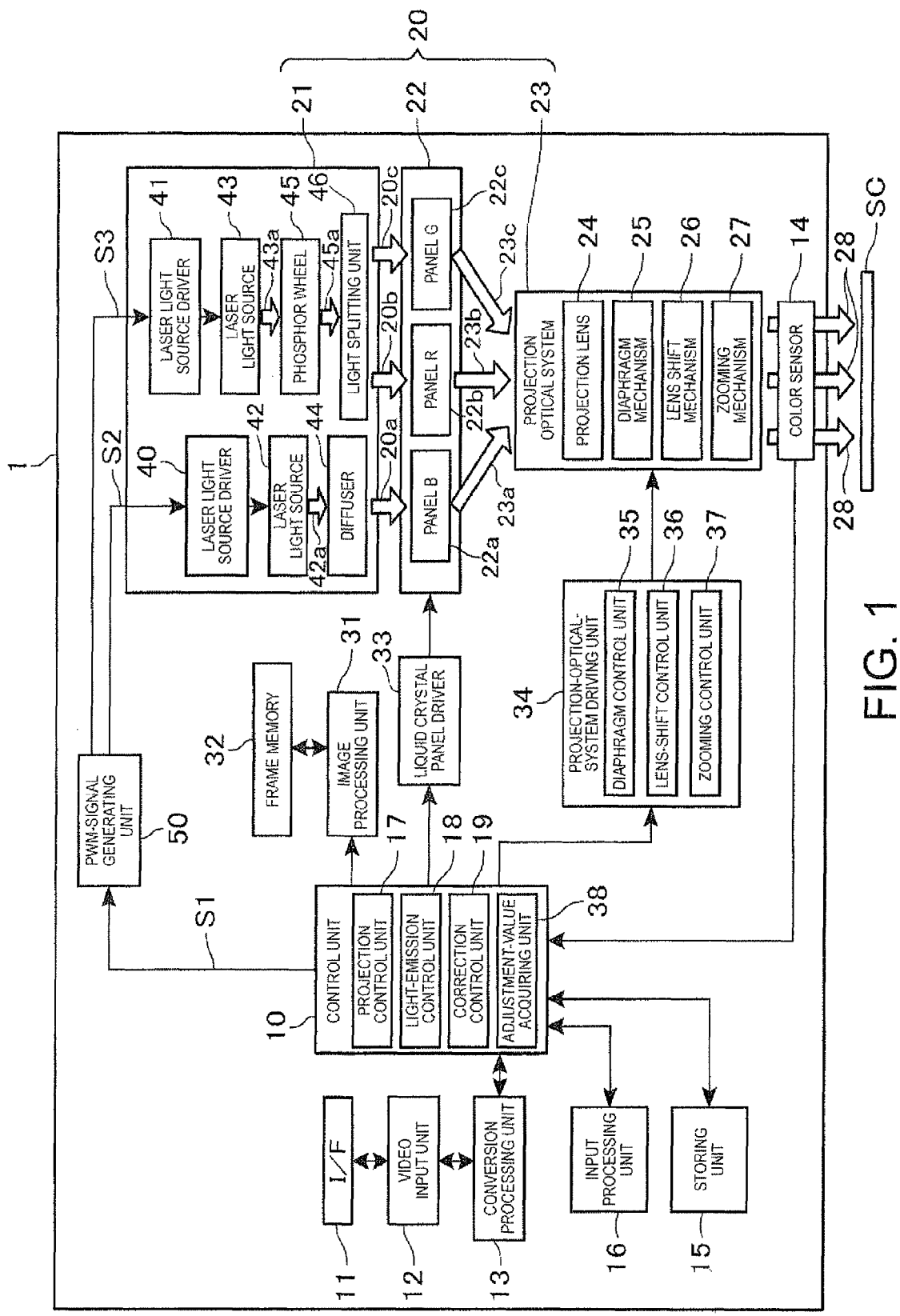
FIG. 1 is a functional block diagram of a projector.

FIG. 1 is a block diagram showing a functional configuration of a projector 1 according to the embodiment. The projector 1 is a display apparatus that projects an image on a screen SC (a projection surface). The projector 1 is connected to a computer such as a PC or an external image supply apparatus such as various image players (not shown in the figure) via an I/F (interface) 11. The projector 1 projects an image based on digital image data input to the interface 11 on the screen SC.

The projector 1 includes a projecting unit 20 configured to form an optical image and an image processing system configured to electrically process an image signal input to the projecting unit 20. These units operate according to the control by a control unit 10.

The projecting unit 20 includes a light source unit 21, a light modulating device (a modulating unit) 22, and a projection optical system (a projecting unit) 23. The light source unit 21 includes a light source capable of subjecting luminance to PWM control using a pulse signal such as an LED or a laser light source. In a configuration illustrated in this embodiment, the light source unit 21 includes laser light sources 42 and 43 including two blue semiconductor laser elements that emit blue laser light. The laser light sources 42 and 43 may include a plurality of semiconductor elements and emit a plurality of laser beams.

The light modulating device 22 receives a signal from the image processing system explained below and modulates lights emitted by the light source unit 21. Modulated lights (image lights) 23a, 23b, and 23c modulated by the light modulating device 22 are guided to the projection optical system 23. Examples of a specific configuration of the light modulating device 22 include a system in which three transmissive or reflective liquid crystal light valves corresponding to the respective colors of RGB are used. In this embodiment, the light modulating device 22 includes three transmissive liquid crystal panels corresponding to color lights of the three colors of RGB, i.e., a liquid crystal panel 22a configured to modulate blue light (B), a liquid crystal panel 22b configured to modulate red light (R), and a liquid crystal panel 22c configured to modulate green light (G). The liquid crystal panels 22a, 22b, and 22c included in the light modulating device 22 are driven by a liquid crystal panel driver 33 explained below to change the transmittances of lights in pixels arranged in a matrix shape in the liquid crystal panels to thereby form images.

The color lights of RGB modulated by the light modulating device 22 are combined by a not-shown cross-dichroic prism and guided to the projection optical system 23.

The projection optical system 23 includes a projection lens 24, which is a lens group for projecting the modulated lights 23a, 23b, and 23c modulated by the light modulating device 22 on the screen SC and focusing the modulated lights 23a, 23b, and 23c. The projection optical system 23 further includes a diaphragm mechanism 25 configured to adjust a diaphragm, a lens shift mechanism 26 configured to adjust a lens shift, and a zooming mechanism 27 configured to adjust zooming. To the diaphragm mechanism 25, the lens shift mechanism 26, and the zooming mechanism 27, a projection-optical-system driving unit (an optical-system adjusting unit) 34 configured to drive the mechanisms 25, 26, and 27 according to the control by the control unit 10 is connected.

To the light source unit 21, a PWM-signal generating unit (a light-emission-amount adjusting unit) 50 configured to output pulse signals S2 and S3 for controlling light emission of the laser light sources 42 and 43 is connected. The light source unit 21 includes a laser light source driver 40 configured to drive the laser light source 42 according to the pulse signal S2 input from the PWM-signal generating unit 50 and switch lighting and extinguishing and a laser light source driver 41 configured to drive the laser light source 43 according to the pulse signal S3 input from the PWM-signal generating unit 50 and switch lighting and extinguishing.

The laser light source 42 is driven by the laser light source driver 40 to emit blue laser light 42a. The blue laser light 42a is diffused through a diffuser 44. The diffused laser light is made incident on the liquid crystal panel 22a of the light modulating device 22 as blue light 20a and modulated by the liquid crystal panel 22a. On the other hand, the laser light source 43 is driven by the laser light source driver 41 to emit blue laser light in the same manner as the laser light source 42. The blue laser light emitted by the laser light source 43 is irradiated on a phosphor of a phosphor wheel 45, converted into yellow light 45a, and made incident on a light splitting unit 46. The light splitting unit 46 splits the yellow light 45a according to wavelength components. Split red light 20b and green light 20c are respectively made incident on the liquid crystal panel 22b and the liquid crystal panel 22c. That is, the phosphor wheel 45 and the light splitting unit 46 have a function of a color-light modulating unit configured to generate a plurality of color lights from the light emitted by the laser light source 43 in the light source unit 21.

The PWM-signal generating unit (the light-emission-amount adjusting unit) 50 has a function of subjecting the laser light sources 42 and 43 to PWM control to thereby light the laser light sources 42 and 43 and adjust the luminance of the laser light sources 42 and 43 to desired luminance according to a control signal S1 input from the control unit 10. The PWM-signal generating unit 50 generates a signal for designating a pulse frequency and pulse width (an ON period) and outputs the signal to the light source unit 21 via a limiter according to the control signal S1 input from the control unit 10.

When the pulses of the pulse signals S2 and S3 rise to ON, the laser light source drivers 40 and 41 light the laser light sources 42 and 43. When the pulses fall to OFF, the laser light source drivers 40 and 41 extinguish the laser light sources 42 and 43.

In the projector 1, a video input unit 12 including an interface 11 and a conversion processing unit 13 configured to execute scaling processing of image data input to the video input unit 12 are connected. The conversion processing unit 13 executes, for example, conversion processing for the resolution of image data and outputs the processed image data to the control unit 10. Image data input to the projector 1 is considered to be moving image (video) data. However, the image data may be still image data.

The interface 11 includes, for example, a DVI (Digital Visual Interface) to which a digital video signal is input, a USB interface and a LAN interface, an S video terminal to which composite video signals such as NTSC, PAL, and SECAM are input, an RCA terminal to which a composite video signal is input, a D terminal to which a component video signal is input, an HDMI connector or the like conforming to an HDMI (registered trademark) standard, and a connector or the like conforming to a DisplayPort (registered trademark) standard established by the VESA (Video Electronics Standards Association). The video input unit 12 may include an A/D conversion circuit configured to convert, when an analog video signal is input to the interface 11, the analog video signal into digital image data. A radio communication interface may be provided in the interface 11.

The image processing system of the projector 1 mainly includes the control unit 10 configured to comprehensively control the entire projector 1. The projector 1 includes a storing unit 15, an input processing unit 16, an image processing unit 31, and a liquid crystal panel driver 33. The storing unit 15 has stored therein data to be processed by the control unit 10 and a control program to be executed by the control unit 10. The input processing unit 16 detects user operation by a not-shown remote controller or operation panel. The image processing unit 31 processes image data and expands an image signal in a frame memory 32. The liquid crystal panel driver 33 drives the liquid crystal panels 22a, 22b, and 22c of the light modulating device 22 on the basis of an image signal output from the image processing unit 31 to perform rendering.

The control unit 10 reads out and executes the control program stored in the storing unit 15 to thereby control the units of the projector 1. The control unit 10 detects, on the basis of operation information input from the input processing unit 16, content of operation performed by a user and controls the image processing unit 31, the liquid crystal panel driver 33, the projection-optical-system driving unit 34, and the PWM-signal generating unit 50 according to the operation to project an image on the screen SC.

The input processing unit 16 has a function of receiving and decoding a radio signal transmitted by the remote controller (not shown in the figure), which is used for operating the projector 1, and detecting operation in the remote controller and a function of detecting button operation in the operation panel (not shown in the figure) of the projector 1. The input processing unit 16 generates an operation signal indicating the operation in the remote controller or the operation panel and outputs the operation signal to the control unit 10. The input processing unit 16 controls, according to the control by the control unit 10, a lighting state of an indicator lamp of the operation panel (not shown in the figure) according to an operation state and a setting state of the projector 1.

The image processing unit 31 acquires, according to the control by the control unit 10, image data output by the conversion processing unit 13 and determines an image size or resolution of the image data and whether the image data is a still image or a moving image and, when the image data is the moving image, determines attributes of the image data such as a frame rate. The image processing unit 31 expands an image in the frame memory 32 for each frame. When the acquired resolution of the image data is different from display resolution of the liquid crystal panels of the light modulating device 22, the image processing unit 31 performs resolution conversion processing. When zooming is instructed by the operation of the remote controller or the operation panel, the image processing unit 31 performs enlargement and reduction processing and expands the processed image in the frame memory 32. Thereafter, the image processing unit 31 outputs the image for each frame expanded in the frame memory 32 to the liquid crystal panel driver 33 as a display signal.

The control unit 10 executes the control program stored in the storing unit 15 to thereby realize functions of a projection control unit 17, a light-emission control unit (the control unit) 18, a correction control unit 19, and an adjustment-value acquiring unit 38.

According to operation detected by the input processing unit 16, the projection control unit 17 initializes the units of the projector 1, controls the PWM-signal generating unit 50 to light the laser light sources 42 and 43, and controls the image processing unit 31 and the liquid crystal panel driver 33 to render images on the liquid crystal panels 22a, 22b, and 22c and project the images. The projection control unit 17 controls the projection-optical-system driving unit 34 to drive the diaphragm mechanism 25, the lens shift mechanism 26, and the zooming mechanism 27.

The light-emission control unit (the control unit) 18 generates the control signal S1 and outputs the control signal S1 to the PWM-signal generating unit 50 when projection is started and during the projection. The control signal S1 designates the pulse width of the pulse signals S2 and S3 input to the laser light source drivers 40 and 41 and a pulse cycle or a period in which pulses are turned off. The light-emission control unit 18 changes the pulse width and the pulse cycle or the period in which the pulses are turned off to thereby adjust light emission amounts of the laser light sources 42 and 43.

The correction control unit 19 calculates a tilt (a projection angle) of the screen SC with respect to the projector 1 and a projection distance to the screen SC and executes correction processing such as trapezoidal distortion correction. The correction control unit 19 controls the image processing unit 31 on the basis of the calculated projection angle and the calculated projection distance to deform an image expanded in the frame memory 32 to thereby correct distortion of a projected image on the screen SC and display a rectangular satisfactory image. For example, when disorder of the projected image on the screen SC is detected or when correction execution is instructed by the operation of the operation panel (not shown in the figure), the correction control unit 19 calculates a projection angle and a projection distance, calculates parameters for correction anew, and executes processing for correcting the projected image according to the calculated parameters.

The adjustment-value acquiring unit (the adjustment-value acquiring unit) 38 acquires, on the basis of a detected value of a color sensor (a detecting unit) 14 configured to detect a color temperature of modulated light (projected light) 28 projected on the screen SC from the projection optical system 23, an adjustment value for adjusting the white balance of the modulated light 28 to a proper value. The modulated light 28 is a combined light obtained by combining, using the projection optical system 23, the blue light 20a, the red light 20b, and the green light 20c emitted by the laser light sources 42 and 43.

The projector 1 is configured to emit color lights of the three colors of red (R), green (G), and blue (B) using the two laser light sources 42 and 43. Therefore, the blue laser light 42a emitted by the laser light source 42 changes to the blue light 20a. However, blue laser light 43a emitted by the laser light source 43 is converted into yellow light 45a and then split into the red light 20b and the green light 20c. For example, when the laser light source 42 and the laser light source 43 perform the same output and the diffuser 44 and the phosphor wheel 45 perform total reflection (at reflectance of 100%), and the light splitting unit 46 reduces a light amount to a half, if the red light 20b and the green light 20c have the same light amount, both the light amounts of the red light 20b and the green light 20c are a half of a light amount of the blue light 20a when the laser light sources 42 and 43 are caused to emit light at the same luminance. In other words, if the light amounts of the blue light 20a, the red light 20b, and the green light 20c are set to the same light amount, it is necessary to set the luminance of the laser light source 42 to a half of the luminance of the laser light source 43. Therefore, in the projector 1, the laser light source 42 and the laser light source 43 are caused to emit light at different luminances in order to suitably balance the light amounts of the blue light 20a, the red light 20b, and the green light 20c. In this embodiment, a ratio (a rate) of the luminance of the laser light source 42 and the luminance of the laser light source 43 is set to set the light amount of the blue light 20a smaller than the light amounts of the red light 20b and the green light 20c. As explained in detail below, setting values concerning the luminances of the laser light sources 42 and 43 and the light amounts of the color lights are stored in the storing unit 15.

A ratio of the light amounts of the blue light 20a, the red light 20b, and the green light 20c is sometimes affected by various conditions such as outputs of the laser light sources 42 and 43, conversion efficiency of conversion of the blue laser light 43a into the yellow light 45a by the phosphor wheel 45, a state of diffusion in the diffuser 44, a light splitting characteristic of the light splitting unit 46, and states of the liquid crystal panels 22a, 22b, and 22c.

The white balance of the projector 1 is adjusted to enable reproduction of accurate white taking these influences into account.

However, in the projector 1 that combines lights emitted from the two laser light sources 42 and 43 and projects combined light, changes in light amounts due to aged deterioration of the laser light sources 42 and 43 are sometimes substantially different depending on an individual difference. When a shift occurs in the changes of the light amounts due to the aged deterioration of the laser light sources 42 and 43, the ratio of the light amounts of the blue light 20a, the red light 20b, and the green light 20c is disordered. When the diaphragm mechanism 25, the lens shift mechanism 26, or the zooming mechanism 27 is driven and a state of the projection optical system 23 changes because of the influence of a difference between optical paths from the laser light sources 42 and 43 to the projection lens 24, a light amount ratio of R:G:B of the modulated light 28 is disordered.

When the ratio of the light amounts of the blue light 20a, the red light 20b, and the green light 20c is disordered because of the influence of the aged deterioration of the laser light sources 42 and 43 or when the ratio of the light amounts of R:G:B of the modulated light 28 is disordered because of the influence of the state change of the projection optical system 23 as explained above, the white balance of a projected image projected on the screen SC shifts. In the projector 1 including the two laser light sources 42 and 43, the white balance changes in a complicated manner because of the various factors explained above.

In order to properly adjust the white balance that changes in a complicated manner in this way, an adjustment value for the color sensor 14 for making the white balance proper is stored in the storing unit 15 in advance using an external sensor (not shown in the figure) during manufacturing of the projector 1. More specifically, an R value, a G value, a B value of a projected image projected on the screen SC from the projector 1 are measured using the external sensor. The light amounts of the blue light 20a, the red light 20b, and the green light 20c are adjusted to set a ratio of measured values of the external sensor to 100:100:100. The external sensor measures RGB values of a projected image actually projected on the screen SC. Therefore, it is possible to appropriately set the white balance of the projector 1 by adjusting the light amounts of the blue light 20a, the red light 20b, and the green light 20c to set a ratio of measured values of the external sensor to 100:100:100. During the manufacturing of the projector 1, a detected value of the color sensor 14 in the projector detected when the white balance is proper, i.e., when a ratio of measured values of the external sensor is 100:100:100 is stored in the storing unit 15 as an adjustment value in association with the state of the projection optical system 23. Light attenuated by an ND filter or the like as appropriate may be led into the external sensor and the color sensor 14.

A procedure in causing the storing unit 15 to store a detected value of the color sensor 14 as an adjusted value of white balance in association with a state of the projection optical system 23 during manufacturing of the projector 1 is explained with reference to flowcharts of FIGS. 2, 3, and 4.

Figure 2:
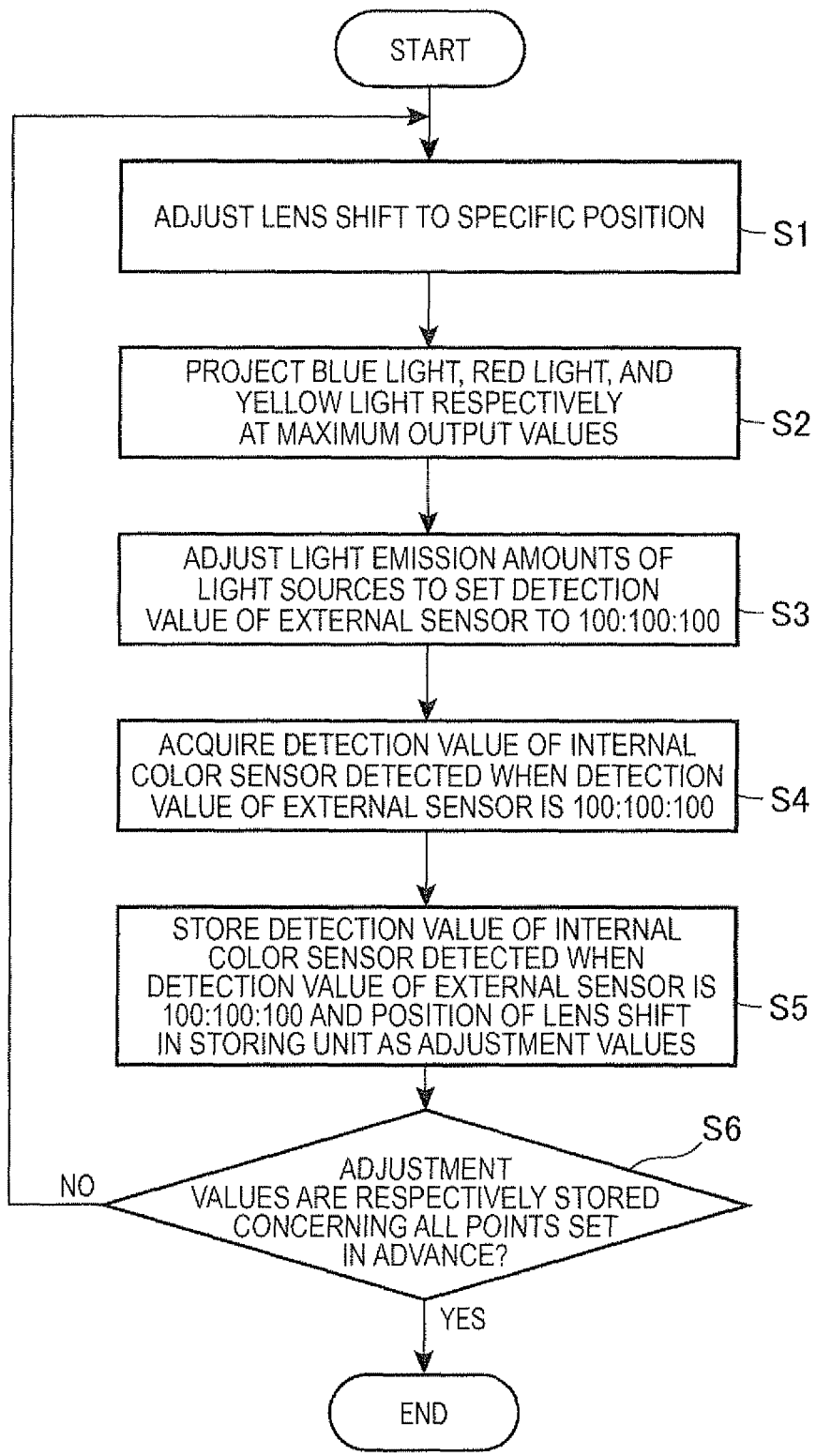
FIG. 2 is a flowchart for explaining a procedure for causing a storing unit to store the position of a projection lens and adjustment values of white balance.

FIG. 2 is a flowchart for explaining a procedure for causing the storing unit 15 to store an adjustment value of white balance adjusted when the position of the projection lens 24 is changed by the lens shift mechanism 26 during manufacturing of the projector 1. The procedure for storing an adjustment value of white balance in the storing unit 15 in association with the position of a lens shift in a manufacturing process of the projector 1 is explained with reference to FIG. 2.

First, on the basis of operation by an operator, the control unit 10 controls the projection-optical-system driving unit 34 to drive the lens shift mechanism 26 to adjust the lens shift to a specific position, for example, the center (step S1). Subsequently, on the basis of operation by the operator, the control unit 10 controls, using the function of the light-emission control unit 18, the laser light sources 42 and 43 such that the blue light 20a, the red light 20b, and the green light 20c are respectively output at maximum output values. Consequently, a white screen before white balance adjustment is projected on the screen SC (step S2). On the white screen before adjustment on which the blue light 20a, the red light 20b, and the green light 20c are respectively output at the maximum output values, since white balance is not properly adjusted, the accurate white is not reproduced.

Subsequently, the control unit 10 adjusts, using the function of the light-emission control unit 18, light emission amounts of the laser light sources 42 and 43 to set an RGB ratio of a projected image measured by the external sensor provided on the outside of the projector 1 to 100:100:100 (step S3). When the RGB ratio of the projected image measured by the external sensor is 100:100:100, the white balance of the projector 1 is properly adjusted and the accurate white is reproduced on the screen SC.

Subsequently, the control unit 10 acquires, using the function of the adjustment-value acquiring unit 38, a detected value of the color sensor 14 on the inside of the projector 1 detected when the RGB ratio of the projected image measured by the external sensor is 100:100:100 (step S4). Consequently, in the color sensor 14, when the position of the lens shift is in the specific position, a light amount ratio of R:G:B of the modulated light 28 for making the white balance proper is detected.

Subsequently, the adjustment-value acquiring unit 38 stores the position of the lens shift and the detected value of the color sensor 14 in the storing unit 15 in association with each other as adjustment values of the white balance (step S5).

The position of the lens shift stored in the storing unit 15 in association with the adjustment value of the white balance can be arbitrarily set. For example, concerning five points in the center and the upper, lower, left, and right maximum positions of the lens shift, the positions of the lens shift and detected values of the color sensor 14 for making the white balance proper may be stored in association with each other as adjustment values of the white balance.

The operator determines whether adjustment values of the white balance are stored in the storing unit 15 concerning all the points set in advance (step S6). When other positions of the lens shift for which adjustment values should be recorded remain (No at step S6), the operator repeats steps S1 to S5 concerning the positions. When determining that adjustment values of the white balance are recorded concerning all the points set in advance (Yes at step S6), the operator ends work for causing the storing unit 15 to store adjustment values of the white balance concerning the lens shift.

Figure 3:
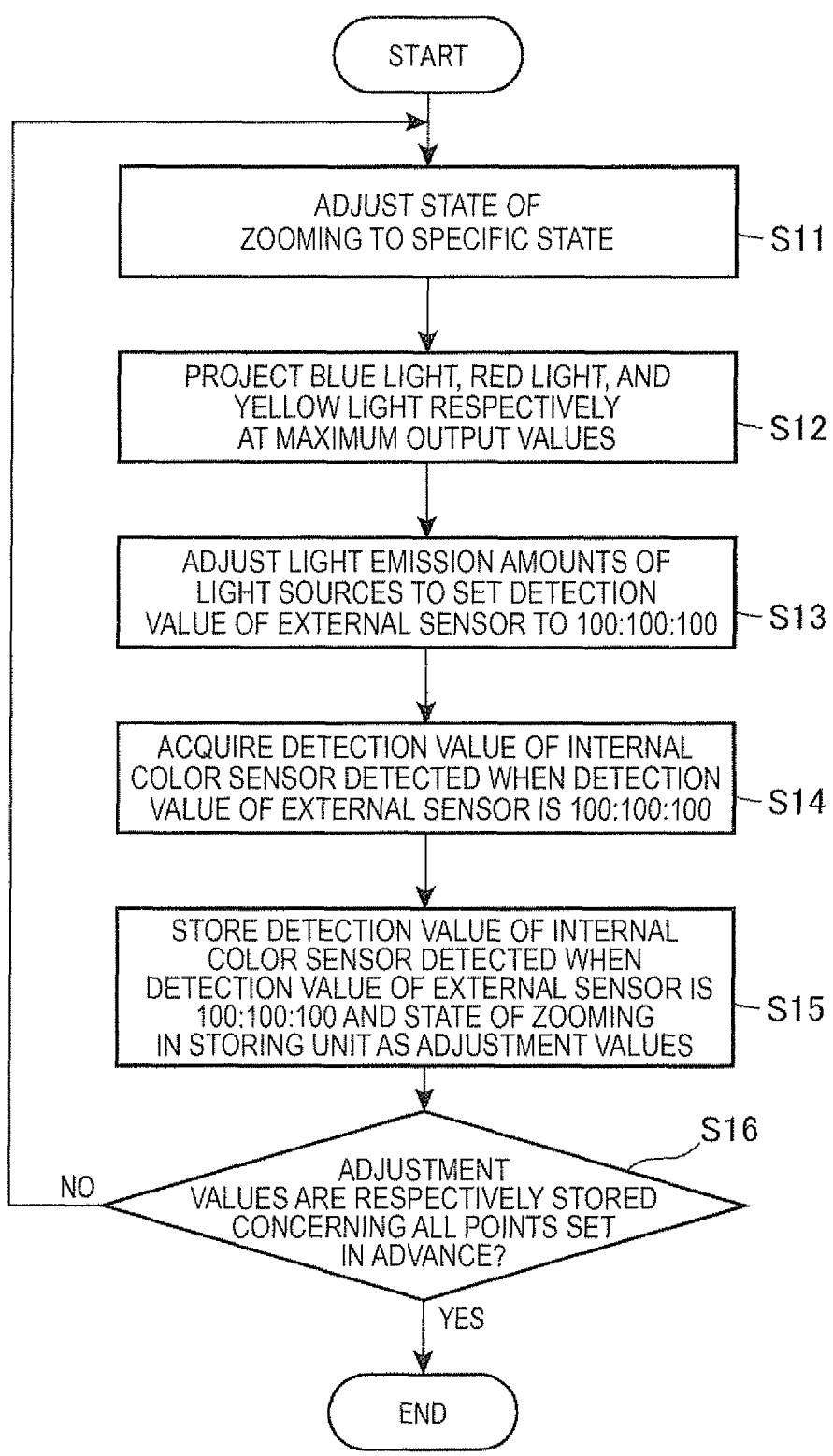
FIG. 3 is a flowchart for explaining a procedure for causing the storing unit to store a state of the zooming of the projection lens and adjustment values of white balance.

FIG. 3 is a flowchart for explaining a procedure for causing the storing unit 15 to store an adjustment value of white balance adjusted when a state of zooming of the projection lens 24 is changed by the zooming mechanism 27 during manufacturing of the projector 1. A procedure for storing an adjustment value of white balance in the storing unit 15 in association with a state of zooming of the projection lens 24 in the manufacturing process of the projector 1 is explained with reference to FIG. 3.

First, on the basis of operation by the operator, the control unit 10 controls the projection-optical-system driving unit 34 to drive the zooming mechanism 27 to adjust a state of zooming of the projection lens 24 to a specific state, for example, the center (step S11). Subsequently, on the basis of operation by the operator, the control unit 10 controls, using the function of the light-emission control unit 18, the laser light sources 42 and 43 such that the blue light 20*a*, the red light 20*b*, and the green light 20*c* are respectively output at maximum output values. Consequently, a white screen before white balance adjustment is projected on the screen SC (step S12). On the white screen before adjustment on which the blue light 20*a*, the red light 20*b*, and the green light 20*c* are respectively output at the maximum output values, since white balance is not properly adjusted, the accurate white is not reproduced.

Subsequently, the control unit 10 adjusts, using the function of the light-emission control unit 18, light emission amounts of the laser light sources 42 and 43 to set an RGB ratio of a projected image measured by the external sensor of the projector 1 to 100:100:100 (step S13). When the RGB ratio of the projected image measured by the external sensor is 100:100:100, the white balance of the projector 1 is properly adjusted and the accurate white is reproduced on the screen SC.

Subsequently, the control unit 10 acquires, using the function of the adjustment-value acquiring unit 38, a detected value detected by the color sensor 14 on the inside of the projector 1 when the RGB ratio of the projected image measured by the external sensor is 100:100:100 (step S14). Consequently, in the color sensor 14, when the state of the zooming of the projection lens 24 is the specific state, a light amount ratio of R:G:B of the modulated light 28 for making the white balance of the projector 1 proper is detected.

Subsequently, the adjustment-value acquiring unit 38 stores the state of the zooming and the detected value of the color sensor 14 in the storing unit 15 in association with each other as adjustment values of the white balance (step S15).

The state of the zooming stored in the storing unit 15 in association with the adjustment value of the white balance can be arbitrarily set. For example, concerning three points in the center and tele and wide maximum positions of the zooming, the states of the zooming and detected values of the color sensor 14 for making the white balance proper may be stored in association with each other as adjustment values of the white balance.

The operator determines whether adjustment values of the white balance are stored in the storing unit 15 concerning all the points set in advance (step S16). When other states of the zooming for which adjustment values should be recorded remain (No at step S16), the operator repeats steps S11 to S15 concerning the states. When determining that adjustment values of the white balance are recorded concerning all the points set in advance (Yes at step S16), the operator ends work for causing the storing unit 15 to store adjustment values of the white balance concerning the states of the zooming.

Figure 4:
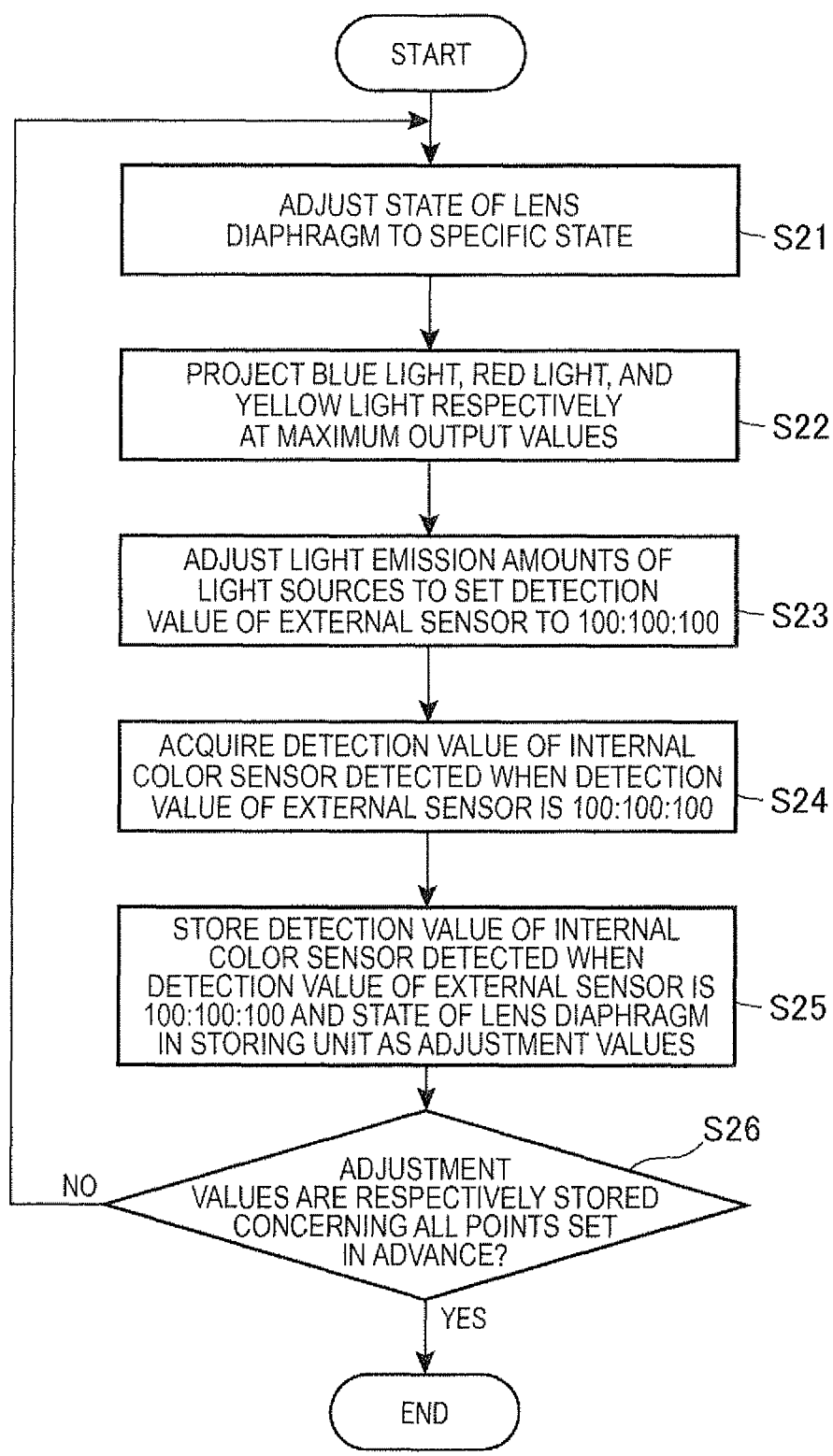
FIG. 4 is a flowchart for explaining a procedure for causing the storing unit to store a state of the lens diaphragm of the projection lens and adjustment values of white balance.

FIG. 4 is a flowchart for explaining a procedure for causing the storing unit 15 to store an adjustment value of white balance adjusted when a state of a diaphragm of the projection lens 24 is changed by the diaphragm mechanism 25 during manufacturing of the projector 1. A procedure for storing an adjustment value of white balance in the storing unit 15 in association with a state of a diaphragm of the projection lens 24 in the manufacturing process of the projector 1 is explained with reference to FIG. 4.

First, on the basis of operation by the operator, the control unit 10 controls the projection-optical-system driving unit 34 to drive the diaphragm mechanism 25 to adjust a state of a diaphragm of the projection lens 24 to a specific state, for example, the center (step S21). Subsequently, on the basis of operation by the operator, the control unit 10 controls, using the function of the light-emission control unit 18, the laser light sources 42 and 43 such that the blue light 20*a*, the red light 20*b*, and the green light 20*c* are respectively output at maximum output values. Consequently, a white screen before white balance adjustment is projected on the screen SC (step S22). On the white screen before adjustment on which the blue light 20*a*, the red light 20*b*, and the green light 20*c* are respectively output at the maximum output values, since white balance is not properly adjusted, the accurate white is not reproduced.

Subsequently, the control unit 10 adjusts, using the function of the light-emission control unit 18, light emission amounts of the laser light sources 42 and 43 to set an RGB ratio of a projected image measured by the external sensor provided on the outside of the projector 1 to 100:100:100 (step S23). When the RGB ratio of the projected image measured by the external sensor is 100:100:100, the white balance of the projector 1 is properly adjusted and the accurate white is reproduced on the screen SC.

Subsequently, the control unit 10 acquires, using the function of the adjustment-value acquiring unit 38, a detected value detected by the color sensor 14 on the inside of the projector 1 when the RGB ratio of the projected image measured by the external sensor is 100:100:100 (step S24). Consequently, in the color sensor 14, when the state of the diaphragm of the projection lens 24 is the specific state, a light amount ratio of R:G:B of the modulated light 28 for making the white balance of the projector 1 proper is detected.

Subsequently, the adjustment-value acquiring unit 38 stores the state of the diaphragm and the detected value of the color sensor 14 in the storing unit 15 in association with each other as adjustment values of the white balance (step S25).

The state of the diaphragm stored in the storing unit 15 as the adjustment value of the white balance can be arbitrarily set. For example, concerning three points in the center and fully closed and fully open maximum positions of the diaphragm, the states of the diaphragm and detected values of the color sensor 14 for making the white balance proper may be stored in association with each other as adjustment values of the white balance.

The operator determines whether adjustment values of the white balance are stored in the storing unit 15 concerning all the points set in advance (step S26). When other states of the diaphragm for which adjustment values should be recorded remain (No at step S26), the operator repeats steps S21 to S25 concerning the states. When determining that adjustment values of the white balance are recorded concerning all the points set in advance (Yes at step S26), the operator ends work for causing the storing unit 15 to store adjustment values of the white balance concerning the states of the diaphragm.

As explained above, in the storing unit 15 of the projector 1, the light amount ratios of R:G:B of the modulated light 28 detected, when the projection optical system 23 is in the specific state, by the color sensor 14 for making the white balance of the projected image proper are stored in advance respectively concerning the plurality of states of the projection optical system 23. The projector 1 can determine, during startup, the states of the projection optical system 23 such as the position of the lens shift, the state of the zooming, and the state of the diaphragm and adjust the white balance on the basis of the states of the projection optical system 23 and the adjustment values of the white balance in the specific state of the projection optical system 23 stored in the storing unit 15.

Figure 5:
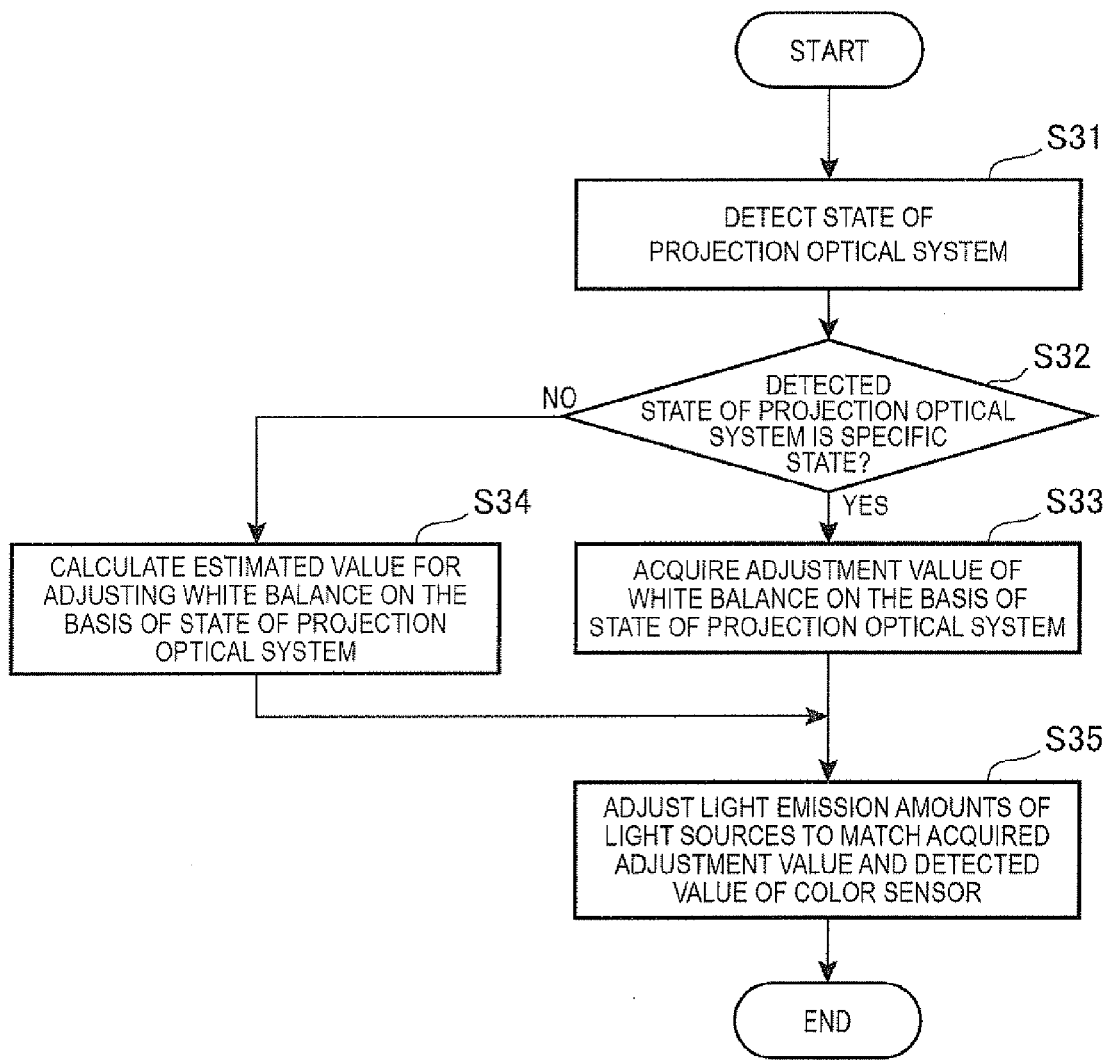
FIG. 5 is a flowchart for explaining the operation of a control unit in performing adjustment of white balance.

The operation of the projector 1 in adjusting white balance on the basis of a specific state of the projection optical system 23 is explained with reference to a flowchart of FIG. 5.

First, during the startup of the projector 1 or when detecting that a state of the projection optical system 23 is changed by user operation, the control unit 10 detects the state of the projection optical system 23 from the projection-optical-system driving unit 34 (step S31). Subsequently, the control unit 10 determines whether the state detected in step S31 is a specific state in which an adjustment value of white balance is stored in advance in the storing unit 15 (step S32). When determining that the state of the projection optical system 23 is the specific state in which an adjustment value of white balance is stored in advance in the storing unit 15 (Yes at step S32), the control unit 10 acquires, using the function of the adjustment-value acquiring unit 38, an adjustment value stored in association with the specific state detected at step S31 from the storing unit 15 (step S33).

When determining that the state of the projection optical system 23 is not the specific state in which an adjustment value of white balance is stored in advance in the storing unit 15 (No at step S32), the control unit 10 calculates, using the function of the adjustment-value acquiring unit 38, from the specific state stored in the storing unit 15 and the adjustment value stored in association with the specific value, an estimated value for appropriately adjusting the white balance with respect to the detected state (step S34).

An example of a method of calculating, from the specific state stored in the storing unit 15 and the adjustment value stored in association with the specific value, an estimated value for appropriately adjusting the white balance with respect to the detected state is explained.

Figure 6A:
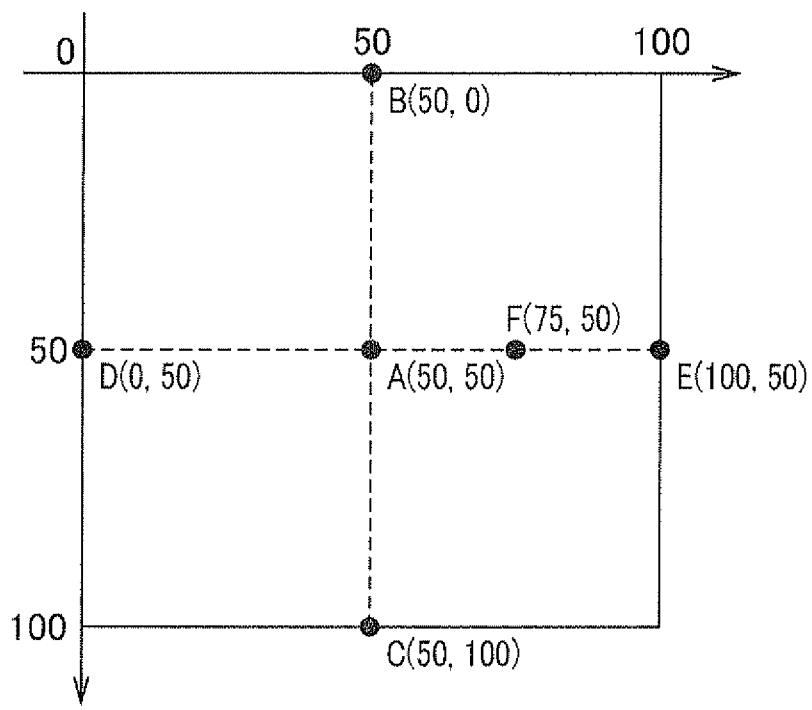
Figure 6B:
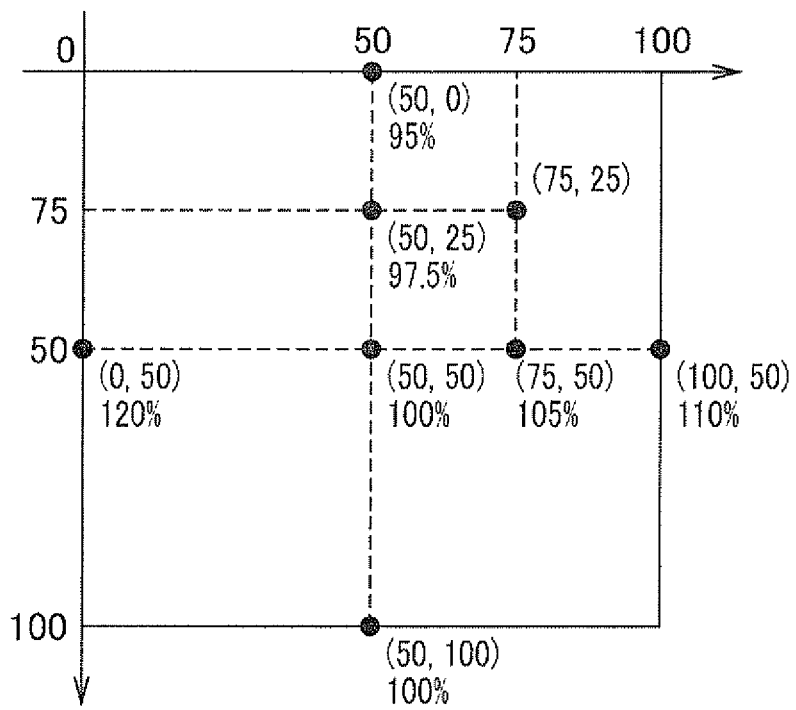
Figure 7A:
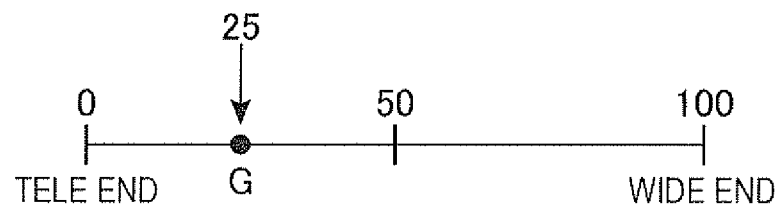
Figure 7B:
Figure 8A:
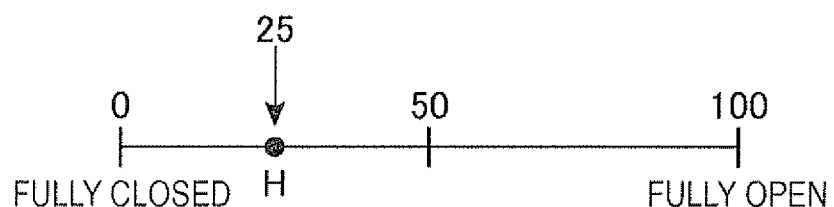
Figure 8B:
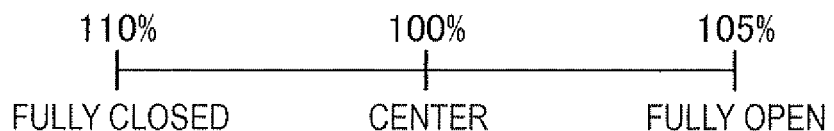

FIGS. 6A and 6B to FIGS. 8A and 8B are diagrams schematically showing a state of the projection optical system 23 detected by the control unit 10. FIGS. 6A and 6B are diagrams showing a state of the lens shift. FIGS. 7A and 7B are diagrams showing a state of the zooming. FIGS. 8A and 8B are diagrams showing a state of the diaphragm.

As illustrated in FIG. 6A, the position of the lens shift is indicated by an XY orthogonal coordinate system. The X axis of the diagram shown in FIG. 6A indicates a lens shift position in the horizontal direction, i.e., a direction horizontal to a grounding surface of the projector 1 and the Y axis of the diagram indicates a lens shift position in the vertical direction. The origin (0, 0) is set in a position indicating a lower limit of an adjustment range of the lens shift and equivalent to the upper left. A maximum value in the adjustment range in the X-axis direction is represented as 100. A maximum value in the adjustment range in the Y-axis direction is represented as 100.

In this embodiment, in an example shown in FIG. 6A, a position A (50, 50) equivalent to the center, a position B (50, 0) equivalent to the upper center, a position C (50, 100) equivalent to the lower center, a position D (0, 50) equivalent to the center left, and a position E (100, 50) equivalent to the center right are set as specific lens shift positions. In the storing unit 15, adjustment values of white balance are stored in association with the respective positions A to E. When it is determined that a position of the lens shift detected by the control unit 10 corresponds to none of the specific positions A to E, the adjustment-value acquiring unit 38 calculates, using an interpolation method such as liner interpolation, quadratic function interpolation, or spline interpolation on the basis of the specific positions A to E stored in the storing unit 15 and the adjustment values corresponding to the specific positions, an estimated value for adjusting the white balance corresponding to the detected position of the lens shift.

For example, when the position of the lens shift detected by the control unit 10 is a position F (75, 50) shown in FIG. 6A, the adjustment-value acquiring unit 38 calculates, on the basis of the adjustment values of the center position A (50, 50) and the center right position E (100, 50), an estimated value for adjusting the white balance with respect to the position F. When the adjustment value (R:G:B) stored in the storing unit 15 in association with the center position A (50, 50) is (98:97:100) and the adjustment value (R:G:B) stored in the storing unit 15 in association with the center right position E (100, 50) is (85:92:90), the estimated value (R:G:B) for adjusting the white balance with respect to the position F (75, 50) is calculated as described below according to the linear interpolation.

$$R=(98+85)\div2=91.5$$

$$G=(97+92)\div2=94.5$$

$$B=(100+90)\div2=95$$

As the positions of the lens shift, as illustrated in FIG. 6B, the position (50, 50) equivalent to the center may be set as a specific lens shift position and adjustment values of the white balance may be stored in association with the specific position. Concerning the position (50, 0) equivalent to the upper center, the position (50, 100) equivalent to the lower center, the position (0, 50) equivalent to the center left, and the position (100, 50) equivalent to the center right, change amounts of the adjustment values from the position equivalent to the center are stored in the storing unit 15 in association with the respective positions. As the change amounts in the respective lens shift positions, for example, when the change amount in the position equivalent to the center is set as 100%, the change amount in the position equivalent to the upper center is stored as 95%, the change amount in the position equivalent to the lower center is stored as 100%, the change amount in the position equivalent to the center left is stored as 120%, and the change amount in the position equivalent to the center right is stored as 110%. When it is determined that the position of the lens shift detected by the control unit 10 does not correspond to the position equivalent to the center, the adjustment-value acquiring unit 38 calculates, using the interpolation method such as the liner interpolation, the quadratic function interpolation, or the spline interpolation on the basis of the adjustment value corresponding to the position equivalent to the center stored in the storing unit 15 and the change amount of the adjustment amount from the position equivalent to the center, an estimated value for adjusting the white balance corresponding to the detected position of the lens shift.

For example, when the position of the lens shift detected by the control unit 10 is (75, 25) of the XY coordinate system shown in FIG. 6B, the adjustment-value acquiring unit 38 calculates, on the basis of the adjustment value of the position (50, 50) equivalent to the center, a change amount in a position (50, 25) equivalent to the middle of the center and the upper center, and a change amount in a position (75, 50) equivalent to the middle of the center and the center right, an estimated value for adjusting the white balance. When the adjustment value (R:G:B) stored in the storing unit 15 in association with the center A (50, 50) is (98:97:100), the change amount stored in the storing unit 15 in association with the upper center is 95%, and the change amount stored in the storing unit 15 in association with the upper right is 110%, the estimated value (R:G:B) for adjusting the white balance with respect to the lens shift position (75, 25) is calculated as described below according to the linear interpolation.

$$R=((100\%+95\%)\div 2)\times ((100\%+110\%)\div 2)\times 98=100.3275$$

$$G=((100\%+95\%)\div 2)\times ((100\%+110\%)\div 2)\times 97=99.30375$$

$$B=((100\%+95\%)\div 2)\times ((100\%+110\%)\div 2)\times 100=102.375$$

In this embodiment, the change amounts of the respective color lights are the same change amount. However, different change amounts may be stored in the storing unit 15 for the respective red light R, green light G, and blue light B in association with specific lens shift positions. With this configuration, it is possible to more appropriately calculate an estimated value for adjusting the white balance.

In an example shown in FIG. 7A, a state of the zooming, i.e., a zooming position is indicated as a relative value with respect to a tele end set to 0 and a wide end set to 100 in an adjustment range of the zooming. For example, when the zooming is set in the center position, a value of the zooming position is 50. Although not shown in the figure, it is also possible to adopt a method of indicating the state of the zooming using a coordinate.

In this embodiment, for example, states in which the zooming position is present in the tele end (a position 0), the center (a position 50), and the wide end (a position 100) can be respectively set as specific states and adjustment values of white balance can be stored in the storing unit 15 in association with the specific states. When it is determined that a state of the zooming detected by the control unit 10 is not the specific states, the adjustment-value acquiring unit 38 calculates, using the interpolation method such as the liner interpolation, the quadratic function interpolation, or the spline interpolation on the basis of the specific states stored in the storing unit 15 and the adjustment values in the specific states, an estimated value for adjusting the white balance corresponding to the detected state of the zooming. For example, when the state of the zooming detected by the control unit 10 is a state G (a position 25) shown in FIG. 7A, the adjustment-value acquiring unit 38 calculates, on the basis of the adjustment values of the states in the center and the tele end, an estimated value for adjusting the white balance with respect to the state G. When the adjustment value (R:G:B) stored in the storing unit 15 in association with the zoom center is (98:97:100) and the adjustment value (R:G:B) stored in the storing unit 15 in association with the zoom tele is (85:92:90), the estimated value (R:G:B) for adjusting the white balance with respect to the state G (25) is calculated as described below according to the linear interpolation.

$$R=(98+85)\div 2=91.5$$

$$G=(97+92)\div 2=94.5$$

$$B=(100+90)\div 2=95$$

As the state of the zooming, as shown in FIG. 7B, a state in which the zooming is adjusted to the center may be set as a specific state and an adjustment value of white balance may be stored in association with the specific state. Concerning states in which the zooming is adjusted to the tele end and the wide end, change amounts of adjustment values from the center are stored in the storing unit 15 in association with the states of the zooming. As the change amounts in the states of the zooming, for example, when a change amount in the state in which the zooming is adjusted to the center is set as 100%, a change amount in the tele end is stored as 90% and a change amount in the wide end is stored as 120%. When it is determined that the state of the zooming detected by the control unit 10 does not correspond to a state equivalent to the state in which the zooming is adjusted to the center, the adjustment-value acquiring unit 38 calculates, using the interpolation method such as the linear interpolation, the quadratic function interpolation, or the spline interpolation on the basis of the adjustment value corresponding to the state in which the zooming is adjusted to the center stored in the storing unit 15 and the change amount of the adjustment amount from the center, an estimated value for adjusting the white balance corresponding to the detected state of the zooming.

For example, when the state of the zooming detected by the control unit 10 is the state in which the zooming is adjusted to the tele end, an estimated value for adjusting the white balance is 90% with respect to the adjustment value in the state in which the state of the zooming is adjusted to the center. When the adjustment value (R:G:B) stored in the storing unit 15 in association with the state in which the zooming is adjusted to the center is (98:97:100) and the change amount in the tele end with respect to the center is 90%, the estimated value is calculated as described below.

$$R=98\times 90\%=88.2$$

$$G=97\times 90\%=87.3$$

$$B=100\times 90\%=90$$

In this embodiment, the change amounts of the respective color lights are the same change amount. However, different change amounts may be stored in the storing unit 15 for the respective red light R, green light G, and blue light B in association with specific states of the zooming. With this configuration, it is possible to more appropriately calculate an estimated value for adjusting the white balance.

In an example shown in FIG. 8A, a state of the lens diaphragm, i.e., an adjusted position of the diaphragm is indicated as a relative position with respect to a fully closed position set to 0 and a fully open position set to 100. For example, when the lens diaphragm is set in the center, a value of the adjusted position is 50. Although not shown in the figure, it is also possible to adopt a method of indicating the state of the lens diaphragm using a coordinate.

In this embodiment, for example, states in which the diaphragm is present in the fully closed (a position 0), the center (a position 50), and the fully open (a position 100) can be respectively set as specific states and adjustment values of white balance can be stored in the storing unit 15 in association with the specific states. When it is determined that a state of the lens diaphragm detected by the control unit 10 is not the specific states, the adjustment-value acquiring unit 38 calculates, using the interpolation method such as the liner interpolation, the quadratic function interpolation, or the spline interpolation on the basis of the specific states stored in the storing unit 15 and the adjustment values in the specific states, an estimated value for adjusting the white balance corresponding to the detected state of the lens diaphragm. For example, when the state of the lens diaphragm detected by the control unit 10 is a state H (a position 25) shown in FIG. 8A, the adjustment-value acquiring unit 38 calculates, on the basis of the adjustment values of the states of the lens diaphragm center and the lens diaphragm fully closed, an estimated value for adjusting the white balance with respect to the state H. When the adjustment value (R:G:B) stored in the storing unit 15 in association with the center is (98:97:100) and the adjustment value (R:G:B) stored in the storing unit 15 in association with the fully closed is (85:92:90), the estimated value (R:G:B) for adjusting the white balance with respect to the state H (25) is calculated as described below according to the linear interpolation.

$R=(98+85) \div 2=91.5$ $G=(97+92) \div 2=94.5$ $B=(100+90) \div 2=95$

As the state of the lens diaphragm, as shown in FIG. 8B, a state in which the lens diaphragm is adjusted to the center may be set as a specific state and an adjustment value of white balance may be stored in association with the specific state. Concerning the fully closed and the fully open of the state of the lens diaphragm, change amounts of adjustment values from the center are stored in the storing unit 15 in association with the states of the lens diaphragm. As the change amounts in the states of the lens diaphragm, for example, when a change amount in the state in which the lens diaphragm is adjusted to the center is set as 100%, a change amount in the fully closed is stored as 110% and a change amount in the fully open is stored as 105%. When it is determined that the state of the lens diaphragm detected by the control unit 10 does not correspond to a state equivalent to the state in which the lens diaphragm is adjusted to the center, the adjustment-value acquiring unit 38 calculates, using the interpolation method such as the linear interpolation, the quadratic function interpolation, or the spline interpolation on the basis of the adjustment value corresponding to the state in which the lens diaphragm is adjusted to the center stored in the storing unit 15 and the change amount of the adjustment amount from the center, an estimated value for adjusting the white balance corresponding to the detected state of the lens diaphragm.

For example, when the state of the lens diaphragm detected by the control unit 10 is the fully closed, an estimated value for adjusting the white balance is 110% with respect to the adjustment value in the state in which the state of the lens diaphragm is adjusted to the center. When the adjustment value (R:G:B) stored in the storing unit 15 in association with the state in which the lens diaphragm is adjusted to the center is (98:97:100) and the change amount in the fully closed is 110%, the estimated value is calculated as described below.

$R=98 \times 110\%=107.8$ $G=97 \times 110\%=106.7$ $B=100 \times 110\%=110$

In this embodiment, the change amounts of the respective color lights are the same change amount. However, different change amounts may be stored in the storing unit 15 for the respective red light R, green light G, and blue light B in association with specific states of the lens diaphragm. With this configuration, it is possible to more appropriately calculate an estimated value for adjusting the white balance.

As explained above, the control unit 10 acquires or calculates, using the function of the adjustment-value acquiring unit 38, an adjustment value or an estimated value of white balance corresponding to the state of the projection optical system 23. Subsequently, the control unit 10 controls the light-emission control unit 18 to adjust the light emission amounts of the laser light sources 42 and 43 to match the adjustment value and the estimated value acquired or calculated by the adjustment-value acquiring unit 38 (step S35). That is, the control unit 10 pulse-controls the light emission amounts of the laser light sources 42 and 43 using the function of the PWM-signal generating unit 50, changes the output values of the blue light 20a, the red light 20b, and the green light 20c, and sets the light amount ratio of R:G:B of the modulated light 28 to a light amount ratio for making the white balance of the projector 1 proper.

With this configuration, it is possible to change the light amount ratio of R:G:B of the modulated light 28 according to the state of the projection optical system 23 to make the white balance of the projector 1 proper. Further, since the light amount ratio of R:G:B of the modulated light 28 projected from the projection optical system 23 is adjusted to make the white balance proper. Therefore, even when the white balance changes in a complicated manner according to a state of an optical system or aged deterioration of a laser light source, it is possible to perform appropriate adjustment and project a high-quality image.

As explained above, the projector 1 according to the embodiment to which the invention is applied includes the projecting unit 20 including the plurality of laser light sources 42 and 43 and the light modulating device 22 configured to modulate lights emitted by the plurality of laser light sources 42 and 43, the projecting unit 20 projecting modulated light modulated by the light modulating device 22, the projection optical system 23 configured to optically change a projection state of the modulated light 28 projected from the projecting unit 20, the projection-optical-system driving unit 34 configured to change a state of the projection optical system 23; the storing unit 15 configured to store states of the projection optical system 23 and adjustment values of light emission amounts of the respective laser light sources 42 and 43 for adjusting the white balance of the modulated light 28 in association with each other, and the PWM-signal generating unit 50 configured to adjust the light emission amounts of the respective laser light sources 42 and 43 on the basis of the adjustment values corresponding to the states of the projection optical system 23. Consequently, even if the white balance changes because of a state change of the projection optical system 23, the light emission amounts of the laser light sources 42 and 43 are adjusted on the basis of the adjustment values stored in the storing unit 15 in advance. Therefore, it is possible to appropriately and quickly adjust the white balance of the modulated light 28.

In the projector 1, the storing unit 15 stores a specific state of the projection optical system 23 and the adjustment values in association with each other. The projector 1 further includes the light-emission control unit 18 configured to adjust, when the projection optical system 23 is adjusted to the specific state by the projection-optical-system driving unit 34, the light emission amounts of the laser light sources 42 and 43 using the PWM-signal generating unit 50 on the basis of the adjustment values stored in the storing unit 15 and adjust, when the projection optical system 23 is adjusted to a state other than the specific state by the projection-optical-system driving unit 34, the light emission amounts of the laser light sources 42 and 43 using the PWM-signal generating unit 50 on the basis of an estimated value calculated from the adjustment values stored in the storing unit 15. Consequently, it is possible to quickly adjust the white balance even if the white balance changes according to a state change of the projection optical system 23. Further, even if adjustment values of the white balance are few, the white balance can be adjusted in various states and a large number of adjustment values are unnecessary. Therefore, it is possible to reduce time required for acquisition of the adjustment values.

The projector 1 further includes the adjustment-value acquiring unit 38 configured to acquire adjustment values for adjusting the white balance of the modulated light 28 when the projection optical system 23 is in the specific state and store a state of the projection optical system 23 and the adjustment values in the storing unit 15 in association with each other. Consequently, since the state of the projection optical system 23 and the adjustment values of the white balance can be stored in association with each other, it is possible to reduce the number of times the adjustment values are actually detected.

The projector 1 further includes the phosphor wheel 45 and the light splitting unit 46 configured to generate a plurality of color lights from light of any one of the laser light sources 42 and 43 through color conversion and/or light splitting and the light modulating device 22 configured to modulate the plurality of color lights generated by the phosphor wheel 45 and the light splitting unit 46. The light-emission control unit 18 calculates, on the basis of the state of the projection optical system 23, adjustment amounts of light amounts of the respective color lights from the adjustment values stored in the storing unit 15 or an estimated value calculated from the adjustment values stored in the storing unit 15 and further calculates adjustment amounts of the respective laser light sources 42 and 43 to adjust light emission amounts of the laser light sources 42 and 43 using the PWM-signal generating unit 50. Consequently, in a configuration in which a plurality of color lights are generated from one laser light source 43 through color conversion and/or light splitting, even if the white balance changes according to a change in the state of the projection optical system 23, it is possible to appropriately and quickly adjust the white balance.

In the projector 1, the projection optical system 23 includes the lens shift mechanism 26 configured to move the projection lens 24. The projection-optical-system driving unit 34 changes the position of the projection lens 24 using the lens shift mechanism 26. The adjustment-value acquiring unit 38 acquires adjustment values for adjusting, when the position of the projection lens 24 of the projection optical system 23 is a specific position, the white balance of the modulated light 28 obtained by combining the lights emitted by the plurality of laser light sources 42 and 43. Consequently, since the position of the projection lens 24 is changed, for example, even if the white balance changes because of differences among optical path lengths from the respective laser light sources 42 and 43, it is possible to appropriately and quickly adjust the white balance.

The projector 1 further includes the color sensor 14 configured to detect the white balance of the modulated light 28 and the storing unit 15 configured to detect, using the color sensor 14, the white balance of the modulated light 28 when the projection optical system 23 is in the specific state and retain a detected value of the white balance. The adjustment-value acquiring unit 38 acquires the adjustment values from the detected value retained by the storing unit 15. Consequently, it is possible to appropriately adjust the white balance on the basis of an actual detected value. Further, it is possible to calculate an adjustment value obtained from a representative detected value and acquire another adjustment value. Therefore, it is possible to reduce the number of times the white balance is actually detected.

In the projector 1, the adjustment-value acquiring unit 38 acquires the adjustment values on the basis of a measured value obtained by measuring the modulated light 28 on the outside of the projector 1 and the detected value detected by the color sensor 14. Consequently, it is possible to more accurately adjust the white balance by adjusting the white balance using the measured value measured on the outside of the projector 1. It is possible to adjust the white balance without performing a large number of times of detection according to a state change of the projection optical system 23. Therefore, it is possible to prevent an increase in labor and time required for the adjustment.

The embodiment is only an example of a specific form to which the invention is applied and does not limit the invention. The invention can be applied as a form different from the embodiment.

The functional units of the projector 1 shown in FIG. 1 include functional components realized by cooperation of hardware and software. Specific embodiments of the functional units are not specifically limited. Besides, specific detailed components of the units of the projector 1 can be arbitrarily changed without departing from the spirit of the invention.

The projector 1 according to the embodiment is the liquid crystal projector including the liquid crystal panel 22*a* configured to modulate the blue light (B), the liquid crystal panel 22*b* configured to modulate the red light (R), and the liquid crystal panel 22*c* configured to modulate the green light (G). However, the projector 1 is not limited to this and may be a projector including a digital mirror device (DMD).

In the embodiment, the white balance of the modulated light 28 is adjusted to be accurate white, i.e., to set R:G:B to 100:100:100. However, the balance of the color lights of the modulated light may be able to be set to arbitrary colors to set a projection screen to a bluish screen or a reddish screen.

In the embodiment, as an example of changing the state of the projection optical system 23, the position of the lens shift, the state of the zooming, and the state of the lens diaphragm are changed. However, white balance may be appropriately adjusted when setting that affects the white balance is changed, for example, when states of optical components on an optical path such as a cinema filter and anamorphic lens are changed or when a state of an illumination diaphragm is changed.

A color subjected to balance adjustment may be changed according to color mode setting of the projector 1. For example, when the color mode setting is dynamic, the balance of the modulated light 28 may be adjusted to change the modulated light 28 to white. When the color mode setting is a cinema mode, the balance of the modulated light 28 may be adjusted to change the modulated light 28 to a bluish color.

Further, the balance of the modulated light 28 may be adjusted to change the modulated light 28 to an optimal color according to a projection environment. In this case, the projector 1 only has to include an illuminance sensor or a camera for measuring ambient light and adjust the balance of the modulated light 28 to change the modulated light 28 to an appropriate color according to the measured ambient light.

What is claimed is:

1. A projector comprising:
a projecting unit including a plurality of laser light sources, a modulating unit configured to modulate lights emitted by the plurality of laser light sources, and a light splitting unit configured to (i) receive the light emitted by one of the plurality of laser light sources, (ii) split the received light according to wavelength components, and (iii) output the split light to the modulating unit, the projecting unit projecting modulated light modulated by the modulating unit;
an optical system configured to optically change a projection state of the modulated light projected from the projecting unit;
an optical-system adjusting unit configured to change a state of the optical system;
a storing unit configured to store states of the optical system and adjustment values of light emission amounts of the respective laser light sources for adjusting white balance of the modulated light in association with each other;
a light-emission-amount adjusting unit configured to adjust, on the basis of the adjustment values corresponding to the states of the optical system, the light emission amounts of the respective laser light sources by changing at least one signal that is input into a laser light source driver of a said laser light source, and
a control unit configured to generate a control signal input for the light-emission-amount adjusting unit,
the light-emission-amount adjusting unit being configured to adjust the light emission amounts of the respective laser light sources on the basis of the control signal input from the control unit, and
the control unit being configured to adjust, when the optical system is adjusted by the optical-system adjusting unit to a specific state stored in the storage unit in association with the adjustment values, the light emission amounts of the laser light sources using the light-emission-amount adjusting unit on the basis of the adjustment values stored in the storing unit and adjust, when the optical system is adjusted to a state other than the specific state by the optical-system adjusting unit, the light emission amounts of the laser light sources using the light-emission-amount adjusting unit on the basis of an estimated value calculated from the adjustment values stored in the storing unit.

2. The projector according to claim 1, further comprising an adjustment-value acquiring unit configured to acquire adjustment values for adjusting the white balance of the modulated light modulated when the optical system is in the specific state and store a state of the optical system and the adjustment values in the storing unit in association with each other.

3. The projector according to claim 2, wherein
the optical system includes a mechanism configured to move an optical component,
the optical-system adjusting unit changes a position of the optical component using the mechanism, and
the adjustment-value acquiring unit acquires adjustment values for adjusting, when the position of the optical component of the optical system is a specific position, white balance of combined light obtained by combining lights emitted by the plurality of laser light sources.

4. The projector according to claim 2, further comprising:
a detecting unit configured to detect the white balance of the modulated light; and
a detected-value retaining unit configured to detect, using the detecting unit, the white balance of the modulated light modulated when the optical system is in the specific state and retain a detected value of the white balance, wherein
the adjustment-value acquiring unit acquires the adjustment values from the detected value retained by the detected-value retaining unit.

5. The projector according to claim 4, wherein the adjustment-value acquiring unit acquires the adjustment values on the basis of a measured value obtained by measuring the modulated light on an outside of the projector and the detected value detected by the detecting unit.

6. The projector according to claim 1, further comprising:
a color-light converting unit configured to generate a plurality of color lights from light of any one of the laser light sources through color conversion and/or light splitting; and
a modulating unit configured to modulate the plurality of color lights generated by the color-light converting unit, wherein
the control unit calculates, on the basis of the state of the optical system, adjustment amounts of light amounts of the respective color lights from the adjustment values stored in the storing unit or an estimated value calculated from the adjustment values stored in the storing unit and further calculates adjustment amounts of the respective laser light sources to adjust light emission amounts of the light sources using the light-emission-amount adjusting unit.

7. The projector according to claim 1, wherein the projecting unit further includes a phosphor wheel located between the one laser light source and the light splitting unit.

8. The projector according to claim 1, wherein the light emitted by another of the plurality of laser light sources is not received by the light splitting unit.

9. A light emission control method for a projector including a plurality of laser light sources, a projecting unit configured to modulate lights emitted by the plurality of laser light sources by way of a modulating unit and project modulated light, an optical system configured to optically change a projection state of the modulated light projected from the projecting unit, a control unit configured to generate a control signal, and a light splitting unit configured to (i) receive the light emitted by one of the plurality of laser light sources, (ii) split the received light according to wavelength components, and (iii) output the split light to the modulating unit, the light emission control method comprising:
changing a state of the optical system;
storing states of the optical system and adjustment values of light emission amounts of the respective laser light sources for adjusting the white balance of the modulated light in association with each other;
adjusting, on the basis of the adjustment values corresponding to the states of the optical system, the light emission amounts of the respective laser light sources by changing at least one signal that is input into a laser light source driver of a said laser light source;
adjusting the light emission amounts of the respective laser light sources on the basis of the control signal; and
adjusting, when the optical system is adjusted to a specific state of the optical system that is stored in association with the adjustment values, the light emission amounts of the laser light sources on the basis of the stored adjustment values and adjusting, when the optical system is adjusted to a state other than the specific state, the light emission amounts of the laser light sources on the basis of an estimated value calculated from the stored adjustment values.

10. The light emission control method according to claim 9, further comprising:
acquiring adjustment values for adjusting the white balance of the modulated light modulated when the optical system is in the specific state; and
storing a state of the optical system and the adjustment values in association with each other.

11. The light emission control method according to claim 10, further comprising:
changing a position of the optical component using a mechanism included in the optical system; and
acquires adjustment values for adjusting, when the position of the optical component of the optical system is a specific position, white balance of combined light obtained by combining lights emitted by the plurality of laser light sources.

12. The light emission control method according to claim 10, further comprising:
detecting, using a detecting unit, the white balance of the modulated light modulated when the optical system is in the specific state; and
acquiring the adjustment values from the detected value.

13. The light emission control method according to claim 12, further comprising:
acquiring the adjustment values on the basis of a measured value obtained by measuring the modulated light on an outside of the projector and the detected value detected by the detecting unit.

14. The light emission control method according to claim 9, further comprising:
generating a plurality of color lights from light of any one of the laser light sources through color conversion and/or light splitting;
modulating the plurality of generated color lights; and
calculating, on the basis of the state of the optical system, adjustment amounts of light amounts of the respective color lights from the stored adjustment values or an estimated value calculated from the stored adjustment values and further calculating adjustment amounts of the respective laser light sources to adjust light emission amounts of the light sources.

15. The light emission control method according to claim 9, wherein the light emitted by another of the plurality of laser light sources is not received by the light splitting unit.

* * * * *